Dec. 4, 1951  V. L. FRAZIER  2,577,322
TANDEM SPRING SUSPENSION UNIT
Filed July 5, 1950  2 SHEETS—SHEET 1
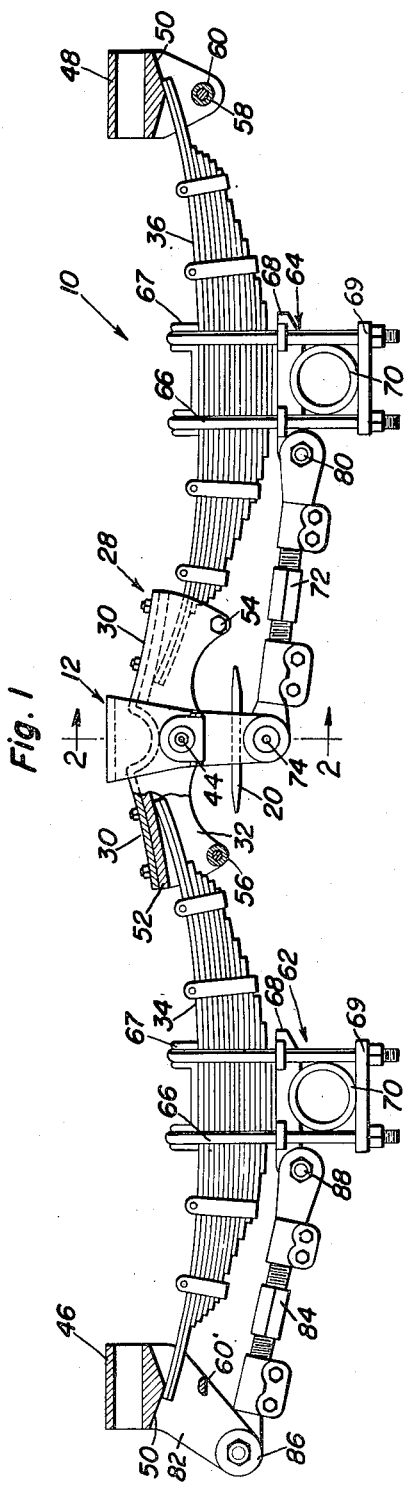
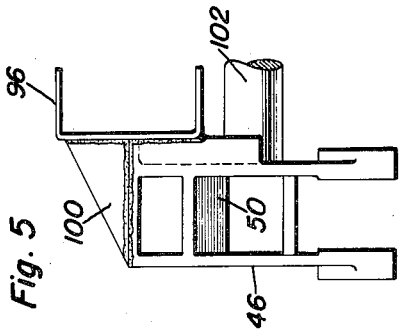
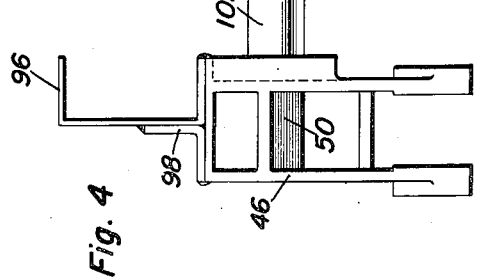
Van L. Frazier
INVENTOR.

Dec. 4, 1951  V. L. FRAZIER  2,577,322
TANDEM SPRING SUSPENSION UNIT
Filed July 5, 1950  2 SHEETS—SHEET 2
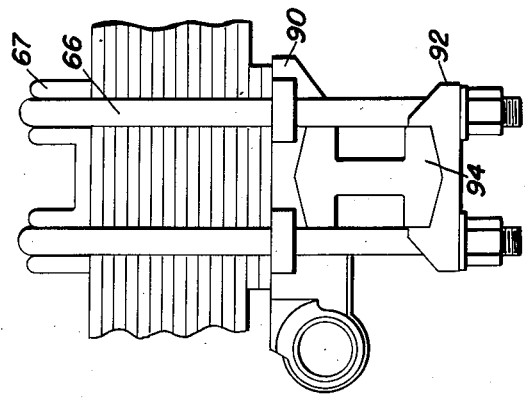
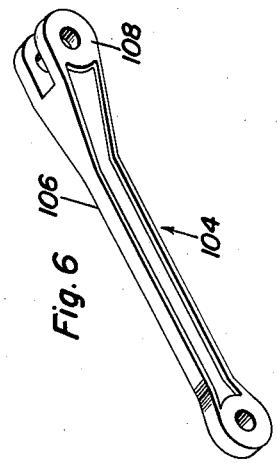
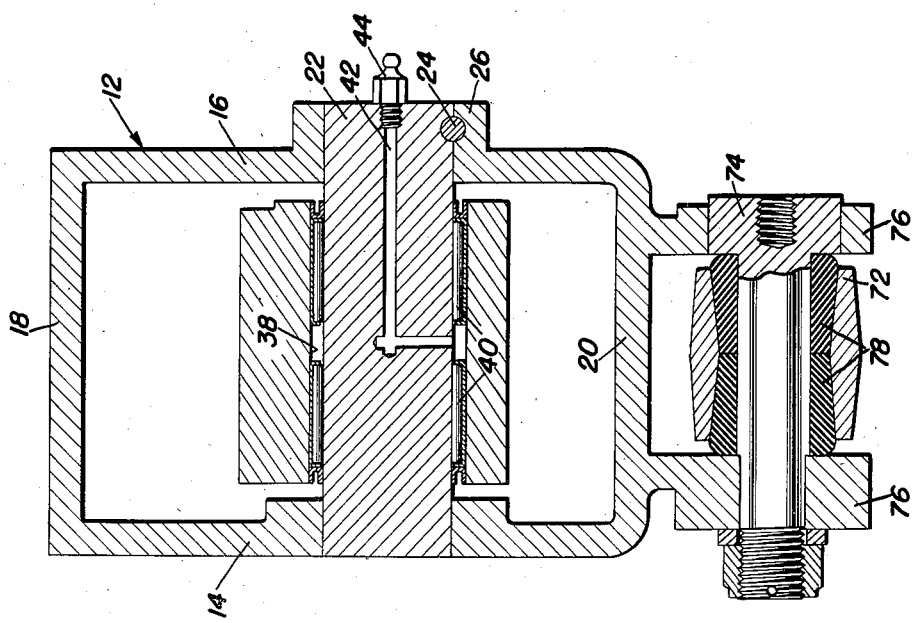
Van L. Frazier
INVENTOR.

Patented Dec. 4, 1951

2,577,322

UNITED STATES PATENT OFFICE 2,577,322

TANDEM SPRING SUSPENSION UNIT

Van L. Frazier, Springfield, Mo., assignor to Frazier Tandem Systems, Incorporated, Springfield, Mo., a corporation of Missouri Application July 5, 1950, Serial No. 172,114

12 Claims. (Cl. 280—104.5)

1

This invention relates to new and useful improvements in tandem spring suspension systems or units, and more particularly pertains to improvements over my Patent No. 2,455,989, issued December 14, 1948.

The primary object of the instant invention is to provide a tandem spring suspension system to equalize axle loads, and in which each axle travels vertically relative to the frame in spaced identical paths of travel to afford a superior and more even braking action and load distribution.

Another important object is to provide a spring suspension system of this character which may be secured either to the sides or below the frame of the vehicle, and the use of any particular system assembly will not be limited by the width of the frame with which the same is to be associated.

Another important object is to provide a system of this character that is resistant to wear, and in which the maximum interchangeability of parts is attained for the reduction of the cost of manufacture, as well as permitting ease of replacement and repair.

A meritorious feature of the present invention resides in the provision of torque arms which extend in the same direction and in parallel relation from the brackets or axle mounting means on the springs to which they are pivoted, and that a pair of such torque arms are adjustable in length to permit adjustment of the system.

Another important feature of the present invention resides in the provision of equalizers pivoted on stub shafts fixedly carried in equalizer housing brackets, and the bearings and lubrication means provided therefor.

A further feature of the present invention resides in the provision of a perch on the equalizer housing bracket for preventing the spring from jumping out of the equalizer.

Still another important feature of the present invention resides in the provision of means on the equalizer housing bracket for alternatively pivotally mounting the forward end of the rear adjustable torque arm or the forward end of the rear rigid torque arm.

Yet another important feature of the present invention resides in the provision of the beveled wearing surfaces in the spring hangers.

A final important feature to be specifically enumerated herein resides in the provision of the forward spring hangers extending forwardly and downwardly so that both axles will have the same radius of action.

These, together with various ancillary features

2 and objects of the invention which will later become apparent as the following description proceeds, are attained by the present invention, a preferred embodiment of which has been illustrated by way of example only in the accompanying drawings, wherein:

Figure 1 is a side elevational view of the left hand unit of the present invention, portions of the same being broken away and shown in section, while other concealed portions of the same are shown in dotted outline;

Figure 2 is a transverse vertical sectional view taken upon the plane of the section line 2—2 of Figure 1;

Figure 3 is a side elevational view of a modified form of the means for mounting the springs on a differently shaped axle;

Figures 4 and 5 are views showing alternative means for securing the forward spring hangers to a vehicle frame, which means obviously may also be applied for mounting the equalizer brackets and the rear spring hangers on the vehicle frame; and Figure 6 is a perspective view of a rigid torque arm that may be substituted for the adjustable torque arms shown in Figure 1.

Reference is now made more specifically to the accompanying drawings, wherein like numerals designate similar parts throughout the various views, and in which the numeral 10 designates the left hand portion of the tandem spring system or unit generally, it being understood that a similar right hand portion will be employed therewith in use.

The system 10 includes an equalizer housing bracket designated generally at 12, which, as shown in Figure 2, is a one-piece casting and consists of a pair of side walls 14 and 16 connected at their upper edges by a plate 18 and at their lower edges by a perch 20 to be more fully described hereinafter. However, it will be understood that the bracket 12 may be fabricated from separate pieces of material. A stub shaft 22 removably extends through the side walls 14 and 16, and which stub shaft 22 is releasably secured in the bracket 12 by means of a removable equalizer shaft bolt 24 through an annular boss 26 formed on the side wall 16, said bolt 24 being retained by a nut, not shown.

An equalizer 28 is pivotally mounted in the bracket 12, which equalizer includes oppositely extending arms 30 which carry spaced depending flanges 32 to constitute inverted U-shaped housings for the adjacent ends of springs 34 and 36. The central portion of the equalizer 28 is provided with a transverse opening 38 which receives the stub shaft 22 to journal the equalizer on the shaft 22, and spaced needle bearings 40 are provided in the opening 38 surrounding the shaft 22.

Means is provided to lubricate the bearings 40 which includes an L-shaped lubrication passage 42 in the shaft 22 communicating with the space between the bearings 40 and a grease fitting 44 is provided for the introduction of lubricant thereinto.

The remote ends of the springs 34 and 36 are received in inverted U-shaped spring hangers 46 and 48, respectively. In order to reduce wear on the ends of the spring, the spring hangers 46 and 48 are provided with beveled wearing surfaces 50, while the equalizer arms 30 are provided with detachable wear plates 52.

In order to prevent the springs being jarred out of position with respect to the equalizer, bolts 54 extend through the flanges 32 which carry rollers 56 between the flanges, while the spring hanger 48 is likewise provided with a pin 58 and a roller 60 for preventing the spring 36 being jarred out of the spring hanger 48. However, it will be understood that bars could be provided in lieu of such pins and rollers that would be cast integrally with the spring hangers, such as the bar 60' formed with the spring hanger 46.

Spring chairs 62 and 64 are provided for the springs 34 and 36, respectively, which are detachably clamped to the springs by means of U-bolts 66 disposed on seats 67, such spring chairs including upper plates 68 and lower clamping plates 69 adapted to clamp the axles 70 therebetween, the plates 68 being interposed between the springs and the axles, it being understood that the thickness of the plates 68 will determine the spacing of the axles below the central portion of the springs.

An adjustable torque arm 72 connects the equalizer housing bracket 12 to the spring chair associated with the spring 36, the forward end of which is pivoted on a pivot bolt 74 extending through spaced legs 76 dependingly carried by the perch 20 and side walls 14 and 16, as is clearly shown in Figure 2. Tapered resilient bushings 78 are provided in the pivotal connection to reduce both wear and vibration. The rear end of the torque arm 72 is bifurcated to receive an apertured pivot ear on the plate 68 and is pivotally connected thereto by a pivot bolt 80.

The forward spring hanger 46 includes spaced, forwardly and downwardly extending legs 82, between the lower extremities of which is received the forward end of an adjustable torque arm 84 that is pivotally connected thereto by means of a bolt 86, it being understood that resilient tapered bushings may be provided in this pivotal connection if desired. As with the adjustable torque arm 72, the rear end of the torque arm 84 is bifurcated and pivotally connected to the plate 68 of the spring chair 62 by means of a pivot bolt 88. It is important to note that the legs 82 of the spring hanger 46 extend forwardly and downwardly so that the torque arms 72 and 84 may be of the same length; so that when the axles 70 are positioned centrally with respect to the springs with which they are associated, and upon rocking movement of the equalizer 28, the axles 70 will alternatively move on vertical arcs that are identical. This fact contributes materially to the equalization of the load on the axles 70 and affords an excellent action of the spring assembly on braking action of the vehicle.

It is of paramount importance that the torque arms 72 and 84 both extend forwardly from the spring chairs, or at least that the torque arms extend in the same direction therefrom, so that, upon braking action, both the torque arms are either placed simultaneously under compression or tension and the axles 70 tend to rise or fall together, so that during braking action the load distribution on the axles will tend to be identical.

As clearly shown in Figure 1, the perch 20 extends forwardly and rearwardly from the equalizer housing bracket 12 so as to be below the adjacent ends of the springs for the purpose of preventing the springs from jumping or being displaced from the oppositely extending arms 30 of the equalizer.

It will be understood that the spring chairs 62 and 64 may be modified to secure the springs to axles that are irregularly shaped rather than round, and in Figure 3 there is shown a modified spring chair plate 90 and clamping plate 92 which have been shaped to conform to the configuration of an axle 94 of an I-shape in cross section.

An important advantage of the present invention resides in the fact that the equalizer housing bracket 12 as well as the spring hangers 46 and 48 may be secured to the side as well as the bottom of the frame of the vehicle with which the spring system is associated, and illustrative of this fact there is illustrated in Figures 4 and 5 alternative means by which the forward spring hanger 46 may be secured to the frame 96 of the vehicle. In Figure 4, the spring hanger 46 is shown as being secured to the bottom of the frame 96, this being accomplished by welding or otherwise suitably securing a formed angle 98 to both the frame 96 and the spring hanger 46, while in Figure 5 the spring hanger is shown as being secured to the side of the frame 96, this being accomplished by means of a gusset plate 100 welded or otherwise suitably secured to the frame 96 and the spring hanger.

One of the primary advantages of the present invention stems from the fact that no cross bars are required whatsoever between the spring systems on opposite sides of the vehicle frame, it being understood that a separate spring system 10, such as illustrated in Figure 1, is to be used on each of the opposite sides of the vehicle frame, so that the use of any particular spring system is independent of the width of the frame to which it is to be connected. However, as illustrative of the fact that cross bars or ties may be utilized between corresponding spring hangers, as well as between the corresponding equalizer housing bracket, there is shown in Figures 4 and 5 cross bars 102 suitably secured to the spring hangers 46, which, it will be understood, are secured at their other ends, to a corresponding spring hanger on the opposite side of the frame.

While the spring suspension unit 12 has been shown as equipped with adjustable torque arms, in use it has been found preferable that only the spring suspension unit on the right hand or curb side of the vehicle frame be equipped with adjustable torque rods, while the left hand spring unit is equipped with rigid torque arms such as shown at 104 in Figure 6, it being understood that the adjustable and rigid torque arms are completely interchangeable in the spring suspension system. The right hand unit is equipped with adjustable torque arms primarily for the reason that the right hand side of the vehicle takes greater road punishment, and is more likely to require adjustment.

It will be seen that the torque arm shown in Figure 6 includes a shank 106 of I-shape cross section and has a bifurcated end 108 to make the same interchangeable with either of the torque arms 72 or 84.

As described, it will be appreciated that the spring system may be efficaciously adjusted by means of the adjustable torque arm 72, and in the preferred construction, since the spring and the spring chairs are identical, the maximum interchangeability of parts is attained.

Since, from the foregoing, the construction and advantages of this device are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. In a tandem spring suspension unit; an equalizer housing bracket comprising a housing opening at opposite ends and including a pair of spaced side walls, a stub shaft extending between the side walls, an equalizer centrally journaled on the shaft and having oppositely extending arms projecting from the housing, a pair of tandem springs having adjacent ends engaging said arms, a horizontal perch carried by the housing, said perch being below and in spaced relation to said equalizer arms and extending sufficiently from the housing to be engageable by the adjacent ends of the springs in order to prevent inadvertent displacement of the springs from the arms.

2. In a tandem spring suspension unit; an equalizer housing bracket comprising a housing opening at opposite ends and including a pair of spaced side walls, a stud shaft extending between the side walls, an equalizer journaled on the shaft and having oppositely extending arms projecting from the housing, a pair of tandem springs having adjacent ends engaging said arms, a horizontal perch connecting said side walls below the stub shaft, said perch being below and in spaced relation to the equalizer arms and having ends overlapping the adjacent ends of the springs to prevent inadvertent displacement of the springs from the arms, and means carried by the equalizer housing bracket below the perch for pivotally coupling the same to a torque rod.

3. A tandem spring suspension unit comprising an equalizer housing bracket consisting of a housing opening at opposite ends and adapted to be secured to a vehicle frame, a stub shaft in the housing, an equalizer centrally journaled on the shaft and having oppositely extending arms projecting from the housing, a pair of spring hangers adapted to be secured to a vehicle frame and on opposite sides of the equalizer housing bracket, a pair of springs each one of which connects one of the hangers to one arm of the equalizer, a perch held in fixed relation relative to the housing and disposed below the adjacent ends of the springs for preventing displacement of the springs from the arms, means carried centrally of each of the springs for securing the same to an axle, a pair of torque arms below the springs, one of the torque arms having pivotal connection at one end with one of the spring hangers and at the other end with said spring securing means nearest thereto, the other of said torque arms having pivotal connection at one end with the equalizer housing bracket and at the other end with the other of said spring securing means.

4. The combination of claim 3, wherein at least one of the torque arms is adjustable in length.

5. A tandem spring suspension unit comprising an equalizer housing bracket consisting of a housing opening at opposite ends and adapted to be secured to a vehicle frame, a stub shaft in the housing, an equalizer centrally journaled on the shaft and having oppositely extending equalizer arms projecting from the housing, a pair of spring hangers adapted to be secured to a vehicle frame and on opposite sides of the equalizer housing bracket, a pair of springs each one of which connects one of the hangers to one arm of the equalizer, means carried centrally of each of the springs for securing the same to an axle, a pair of torque arms below the springs, one of the torque arms having pivotal connection at one end with one of the spring hangers and at the other end with said means adjacent thereto, the other of said torque arms having pivotal connection at one end with the equalizer housing bracket and at the other end with the other of said means, and a perch carried by the equalizer housing bracket below the stub shaft, said perch being below and in spaced relation to said equalizer arms and overlapping adjacent ends of the springs to prevent substantial displacement of the springs relative to the equalizer arms.

6. In a tandem spring suspension unit; a frame and a pair of spring hangers carried thereby, an equalizer housing bracket carried by the frame between the spring hangers, said bracket including a housing opening at opposite ends and a stub shaft secured therein, an equalizer journaled on the shaft and having oppositely extending arms projecting from the housing, a pair of springs in tandem, said hangers engaging the remote ends of the springs, the adjacent ends of the springs being in engagement with the arms of the equalizer, a perch fixed with respect to the housing and disposed below the adjacent ends of the springs for preventing inadvertent displacement of the springs from the arms, a pair of torque arms below said springs, means for pivotally securing the rear ends of the torque arms to the springs, means for pivotally connecting the forward end of one of the torque arms to the equalizer housing bracket, and means for pivotally connecting the forward end of the other torque arm to one of the spring hangers.

7. In a tandem spring suspension unit; a frame and a pair of spring hangers carried thereby, an equalizer housing bracket carried by the frame between the spring hangers, said bracket including a housing opening at opposite ends and a stub shaft secured therein, an equalizer journaled on the shaft and having oppositely extending arms projecting from the housing, a pair of springs in tandem, said hangers receiving the remote ends of the springs and having beveled wearing surfaces in engagement therewith, the adjacent ends of the springs being in engagement with the arms of the equalizer, a pair of torque arms below said springs, means for pivotally securing the rear ends of the torque arms to the springs, means for pivotally connecting the forward end of one of the torque arms to the equalizer housing bracket, means for pivotally connecting the forward end of the other torque arm to one of the spring hangers, and a perch fixedly secured to the equalizer housing bracket below the stub shaft, said perch being disposed below and in spaced relation to the adjacent ends of the springs and overlapping the adjacent ends of the springs for preventing displacement of the springs from the equalizer arms.

8. The combination of claim 7, wherein said last means includes a pair of forward and downwardly extending legs integral with said one of the spring hangers, said other torque arm being pivotally received between the lower ends of the legs.

9. A tandem spring suspension unit comprising a pair of units secured to the side members of a vehicle frame, each of said units including a forward and a rear spring hanger and an equalizer housing bracket disposed between said hangers, said equalizer housing comprising a pair of spaced side walls connected by a stub shaft, an equalizer journaled on said shaft and having a pair of oppositely extending arms, a pair of springs in tandem arrangement and with each of the springs connecting one of the spring hangers to the adjacent arm of the equalizer, a perch connecting the side walls below the shaft and extending below the adjacent ends of the springs, a pair of torque arms each having a forward and a rear end, one of said torque arms having its forward end pivotally connected to the forward spring hanger and the other torque arm having its forward end pivotally connected to the equalizer housing bracket at a position below the perch, a spring chair secured to each of said springs, the rear ends of each of said torque arms being pivotally connected to the spring chair immediately rearwardly thereof.

10. The combination of claim 9, wherein the torque arms of at least one of said units are adjustable in length.

11. The combination of claim 9, wherein the spring hangers and the equalizer housing bracket of each of said units are secured to the sides of said frame side members.

12. The combination of claim 9, wherein the spring hangers and the equalizer housing bracket of each of said units are secured to the under side of said frame side members in depending relation thereto.

VAN L. FRAZIER.

REFERENCES CITED

The following references are of record in the file of this patent:

UNITED STATES PATENTS

| Number | Name | Date |
|---|---|---|
| 2,204,087 | Konetsky | June 11, 1940 |
| 2,399,284 | Moore | Apr. 30, 1946 |
| 2,417,690 | Keller | Mar. 18, 1947 |
| 2,455,989 | Frazier | Dec. 14, 1948 |
| 2,508,634 | Ziegler | May 23, 1950 |